US008681901B2

(12) United States Patent
Yang et al.

(10) Patent No.: US 8,681,901 B2
(45) Date of Patent: Mar. 25, 2014

(54) APPARATUS AND METHOD FOR DETECTING SIGNAL IN A SPATIAL MULTIPLEXING MULTIPLE INPUT MULTIPLE OUTPUT COMMUNICATION SYSTEM

(75) Inventors: Joo-Yeol Yang, Suwon-si (KR); Jae-Seok Kim, Seoul (KR); In-Hyoung Kim, Yongin-si (KR); Yun-Ho Jung, Paju-si (KR); Hae-Dong Yeon, Hwaseong-si (KR); Kil-Hwan Kim, Seoul (KR); Mi-Suk Cho, Bucheon-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 220 days.

(21) Appl. No.: 13/016,325

(22) Filed: Jan. 28, 2011

(65) Prior Publication Data

US 2011/0188615 A1    Aug. 4, 2011

(30) Foreign Application Priority Data

Jan. 29, 2010  (KR) ........................ 10-2010-0008791

(51) Int. Cl.
*H04L 27/06* (2006.01)
*H04L 27/00* (2006.01)

(52) U.S. Cl.
USPC ........... 375/340; 375/267; 375/316; 375/259; 375/260

(58) Field of Classification Search
USPC .......................... 375/340, 267, 316, 259, 260
See application file for complete search history.

(56) References Cited

U.S. PATENT DOCUMENTS

| 2007/0230608 | A1* | 10/2007 | Li ................................. | 375/267 |
| 2008/0095257 | A1* | 4/2008 | Maeda et al. ................. | 375/262 |
| 2008/0279299 | A1* | 11/2008 | Reuven et al. ................ | 375/267 |
| 2008/0310556 | A1* | 12/2008 | Lee et al. ...................... | 375/340 |
| 2010/0142654 | A1* | 6/2010 | Bang et al. .................... | 375/340 |

* cited by examiner

*Primary Examiner* — Chieh M Fan
*Assistant Examiner* — Michelle M Koeth

(57) ABSTRACT

A Spatial Multiplexing Multiple Input Multiple Output (SM-MIMO) communication system, which generates Q and R matrices through QR decomposing a channel matrix in an array order corresponding to an order of transmission antennas of a signal transmission device, determines a detection order of transmission symbols included in a transmission symbol vector, QR decomposes a reception signal vector and generates the QR decomposed reception signal vector as a transformed reception signal vector, substitutes all of transmittable candidate symbols for a transmission symbol corresponding to a first detection order among the transmission symbols and sequentially removes interference in the transformed reception signal vector, detects candidate symbols of transmission symbols corresponding to a remaining detection order from the interference-removed transformed reception signal vector, combines the detected candidate symbols, detects candidate symbol vectors, and calculates Log-Likelihood Ratio values of bits included in the transmission symbols by using the detected vectors.

20 Claims, 14 Drawing Sheets

FIG.4A  $\mathbf{x} = \begin{bmatrix} x_1 \\ x_2 \\ x_3 \\ x_4 \end{bmatrix}$ ↑

⟶ : DETECTION ORDER

FIG.4B  $\mathbf{x}_1 = \begin{bmatrix} x_4 \\ x_1 \\ x_2 \\ x_3 \end{bmatrix}$ ↑   $\mathbf{x}_2 = \begin{bmatrix} x_4 \\ x_1 \\ x_3 \\ x_2 \end{bmatrix}$ ↑   $\mathbf{x}_3 = \begin{bmatrix} x_4 \\ x_2 \\ x_3 \\ x_1 \end{bmatrix}$ ↑

APPARATUS AND METHOD FOR DETECTING SIGNAL IN A SPATIAL MULTIPLEXING MULTIPLE INPUT MULTIPLE OUTPUT COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application entitled "Apparatus and Method for Detecting Signal in a Spatial Multiplexing Multiple Input Multiple Output Communication System" filed in the Korean Industrial Property Office on Jan. 29, 2010 and assigned Serial No. 10-2010-0008791, the contents of which are incorporated herein by reference.

TECHNICAL FIELD OF THE INVENTION

The present invention relates to an apparatus and a method for detecting a signal in a communication system using a Spatial Multiplexing Multiple Input Multiple Output (SM-MIMO) scheme (hereinafter, referred to as the 'SM-MIMO communication system').

BACKGROUND OF THE INVENTION

The SM-MIMO communication system is a communication system employing the SM scheme and the MIMO scheme, and various signal detection schemes, such as the ML (Maximum Likelihood) scheme, the ZF (Zero Forcing) scheme, the MMSE (Minimum Mean Square Error) scheme, the OSIC (Order Successive Interference Cancellation) scheme, the sphere decoding scheme, and the QRD-M (QR Decomposition-M), have been suggested in the SM-MIMO communication system.

The ZF scheme and the MMSE scheme have lower complexity, but their performance deterioration is very large in comparison with the ML scheme. Further, the OSIC scheme generates more performance deterioration in comparison with the ML scheme. Further, the sphere decoding scheme has identical performance to the ML scheme, but it has difficulty in obtaining a radius of an initial sphere and it requires very large calculation quantity in consideration of the worst channel condition such that it is difficult to achieve the actual implementation of the sphere decoding scheme. Further, the QRD-M scheme has performance that greatly differs according to the number of candidate groups, such that the multiple candidate groups are required so as to obtain performance identical to that of the ML scheme, and in the event of considering the multiple candidate groups, the calculation complexity in the QRD-M scheme increases.

A signal transmission device of the SM-MIMO communication system uses a channel coding scheme so as to improve the performance and increase the channel capacity. Therefore, a signal reception device corresponding to the signal transmission device generates a LLR (Log-Likelihood Ratio) value for soft decision of a channel decoder.

When the ZF scheme, the MMSE scheme, the OSIC scheme, the sphere decoding scheme, the QRD-M scheme, and the like, are used, the signal reception device calculates a square value of the Euclidean distance of the candidate group for generating the LLR value. Especially, when the signal reception device uses the sphere decoding scheme, the large number of candidate groups of the detected signals are used for the performance improvement and thus the calculation complexity also increases.

In the QRD-M scheme, the Euclidean distances are required in order to generate the LLR value, for both the situation where a value of each bit is 0 and the situation where each bit has a value of 1. However, a corresponding bit may be null in the candidate group, which may make it impossible to detect the LLR value. Various schemes for estimating the Euclidean distance of the null bit have been suggested, but they have still include a limitation in the accuracy aspect, so that it may be impossible to generate the optimum LLR value.

As described above, the signal detection schemes suggested in the SM-MIMO communication system have deteriorated performance and increased calculation complexity in a process of the LLR value generation, as well as a process of the signal detection, in comparison with the ML scheme. Therefore, a signal detecting scheme, which can show a performance similar to that of the ML scheme and decrease the calculation complexity, has been necessarily demanded.

SUMMARY OF THE INVENTION

To address the above-discussed deficiencies of the prior art, it is a primary object to provide an apparatus and a method for detecting a signal in the SM-MIMO communication system.

In accordance with an aspect of the present invention, there is provided an apparatus for detecting a signal in a Spatial Multiplexing Multiple Input Multiple Output (SM-MIMO) communication system. The apparatus includes a channel array/QR decomposer configured to generate a Q matrix and an R matrix through QR decomposing a channel matrix in an array order corresponding to an order of transmission antennas of a signal transmission device, and determine a detection order of transmission symbols included in a transmission symbol vector. The apparatus also includes a reception signal vector transformer configured to QR decompose a reception signal vector and generating the QR decomposed reception signal vector as a transformed reception signal vector. The apparatus further includes a candidate symbol vector detector configured to substitute all of transmittable candidate symbols for a transmission symbol corresponding to a first detection order among the transmission symbols, sequentially remove interference in the transformed reception signal vector, detect candidate symbols of transmission symbols corresponding to a remaining detection order from the interference-removed transformed reception signal vector, combine the detected candidate symbols, and detect candidate symbol vectors. The apparatus also includes an LLR computation unit configured to calculate LLR values of bits included in the transmission symbols by using the detected candidate symbol vectors.

In accordance with another aspect of the present invention, there is provided a method for detecting a signal in a Spatial Multiplexing Multiple Input Multiple Output (SM-MIMO) communication system. The method includes generating a Q matrix and an R matrix through QR decomposing a channel matrix in an array order corresponding to an order of transmission antennas of a signal transmission device. The method also includes determining a detection order of transmission symbols included in a transmission symbol vector. The method also includes QR decomposing a reception signal vector and generating the QR decomposed reception signal vector as a transformed reception signal vector. The method further includes substituting all of transmittable candidate symbols for a transmission symbol corresponding to a first detection order among the transmission symbols and sequentially removing interference in the transformed reception signal vector. The method further includes detecting candidate symbols of transmission symbols corresponding to a remaining detection order from the interference-removed transformed reception signal vector, combining the detected candidate symbols, and detecting candidate symbol vectors. The method also includes calculating LLR (Log-Likelihood Ratio) values of bits included in the transmission symbols by using the detected candidate symbol vectors.

Accordingly, when the signal is detected in the SM-MIMO communication system, the present invention can diversify the detection orders, generate the candidate symbols to be substituted for the first order in each of the detection orders, detect the candidate symbol vector from the generated candidate symbols, and calculate the LLR value, such that it has an effect of maintaining the almost similar performance with the ML soft-decision scheme and reducing the calculation complexity of the signal reception device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A and 4B schematically illustrate a re-arrayed transmission symbol vector and a changed detection order by a candidate symbol vector extender of FIG. 2;

DETAILED DESCRIPTION OF THE INVENTION

Figure 1:
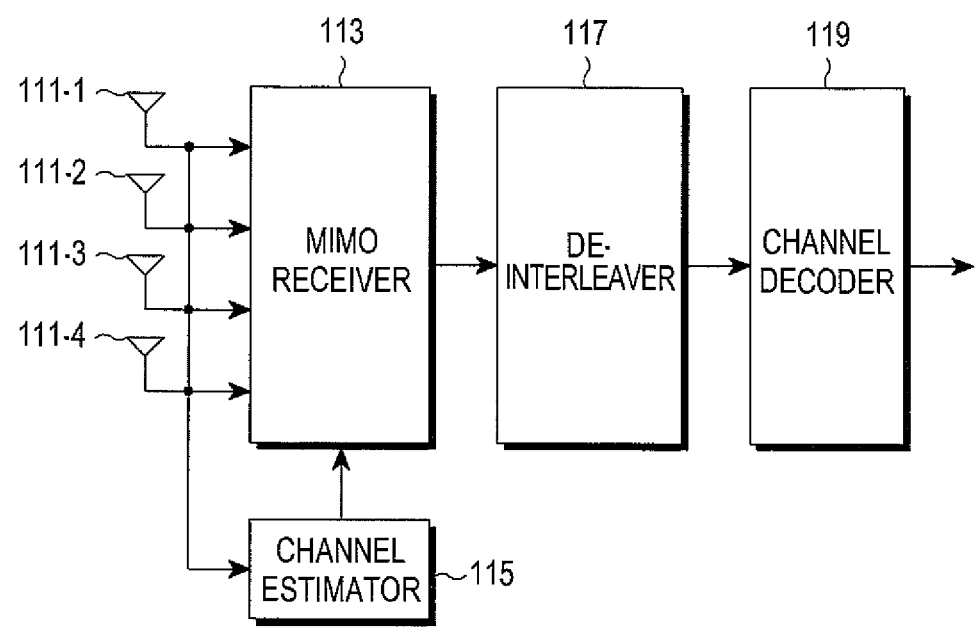
FIG. 1 illustrates a structure of a signal reception device in the SM-MIMO communication system according to an embodiment of the present invention.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Further, in the following description of the present invention, a part necessary for understanding an operation according to the present invention will be described, and a detailed description of known functions and configurations incorporated herein will be omitted when it may make the subject matter of the present invention rather unclear.

The present invention relates to an apparatus and a method for detecting a signal in a communication system using a Spatial Multiplexing Multiple Input Multiple Output (SM-MIMO) scheme (hereinafter, referred to as the 'SM-MIMO communication system'). Herein, the SM-MIMO communication system refers to a communication system using the SM scheme and the MIMO scheme. Hereinafter, in describing the present invention, it is assumed that a signal transmission device of the SM-MIMO communication system uses four transmission antennas, a signal reception device of the SM-MIMO communication system uses four reception antennas, and the signal transmission device employs 64 QAM (Quadrature Amplitude Modulation) scheme as a modulation scheme. Further, the signal detection apparatus and method suggested in the present invention are not controlled by the number of transmission antennas used in the signal transmission device, the modulation scheme, and the number of reception antennas used in the signal reception device in the SM-MIMO communication system.

First, on an assumption that a transmission symbol vector transmitted from the four transmission antennas is x, a reception symbol vector received from the four reception antennas is y, a noise vector added to the reception antenna is n, and a channel matrix between the transmission/reception antennas is H, a relation of the elements is defined by Equation (1) below.

$$y = Hx + n \qquad \text{(Eqn. 1)}$$

In Equation (1), $x = [x_1 \ x_2 \ x_3 \ x_4]^T$, $y = [y_1 \ y_2 \ y_3 \ y_4]^T$, $$n = [n_1 \ n_2 \ n_3 \ n_4]^T, \text{ and } H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}.$$

In Equation (1), $x_j$ represents a transmission symbol transmitted via the $j^{th}$ transmission antenna, $y_i$ represents a reception signal received from an i-th reception antenna, $n_i$ represents a noise added to an i-th reception antenna, and $h_{i,j}$ represents a channel coefficient between an i-th reception antenna and an j-th transmit antenna.

The ML (Maximum Likelihood) scheme is well known as a scheme having the optimum performance when the signal reception device detects a signal transmitted by the signal transmission device using the SM (Spatial Multiplexing) scheme in the MIMO communication system. When the ML scheme is used, the signal reception device calculates a square value of the Euclidean distance between every available symbol vector and a reception signal vector and determines a symbol vector having the smallest square value of the Euclidean distance as the transmission symbol vector.

The ML scheme can be defined by Equation (2) below.

$$X_{ML} = \arg\min_{X \in S} \|y - Hx\|^2 \qquad \text{(Eqn. 2)}$$

In Equation (2), $X_{ML}$ represents a symbol vector detected using the ML scheme and S represents a set of all of the transmittable symbol vectors.

The general communication system uses a channel encoding scheme for the improvement of the performance and the increase of the channel capacity. The channel encoding scheme is a scheme using a channel code and a representative channel code includes a convolutional code, a turbo code, and a low density parity check code. When the channel encoding scheme is used, in order to obtain the optimum performance in the channel decoding, instead of a value of hard decision of $X_{ML}$ as defined in Equation (2), an LLR (Log-Likelihood Ratio) value for each transmission bit is calculated as defined in Equation (3) below.

$$LLR(b_i) = \min_{X \in S_{i,1}} \|y - Hx\|^2 - \min_{X \in S_{i,0}} \|y - Hx\|^2 \qquad \text{(Eqn. 3)}$$

In Equation (3), LLR ($b_i$) represents the LLR value of the $i^{th}$ bit of the detected transmission symbol vector and $s_{i,0}$ and $s_{i,1}$ represent a symbol vector set, in which a value of the $i^{th}$ bit is 0 or 1, among all of the transmittable symbol vector sets. Finally, a scheme for calculating the LLR value as defined in Equation (3) refers to the ML soft-decision scheme. The calculation complexity of the aforementioned ML scheme and the ML soft decision scheme is exponentially increased according to a modulation degree of the transmission symbol and the number of transmission antennas.

For example, when the four transmission antennas are used in the signal transmission device, the four reception antennas are used in the signal reception device, the signal transmission device uses the 64 QAM scheme as the modulation scheme, and the signal reception device uses the ML scheme or the ML soft decision scheme for the reception of the transmission symbol vector transmitted from the signal transmission device, the signal reception device performs the square Euclidian distance operation $64^4$ times. However, it may be difficult or impossible to calculate the square of the Euclidian distance $64^4$ times.

Therefore, the present invention suggests a signal detection scheme which has a performance almost similar with that of the ML soft decision scheme and the considerably low calculation complexity in comparison with the ML soft decision scheme.

First, the structure of the signal reception device in the SM-MIMO communication system according to an embodiment of the present invention will be described with reference to FIG. 1.

FIG. 1 is a diagram schematically illustrating the structure of the signal reception device in the SM-MIMO communication system according to an embodiment of the present invention.

Referring to FIG. 1, the signal reception device includes four reception antennas, i.e. reception antennas 111-1 through 111-4, a MIMO receiver 113, a channel estimator 115, a de-interleaver 117, and a channel decoder 119.

First, a signal received through the reception antennas 111-1 through 111-4 is transmitted to the MIMO receiver 113 and the channel estimator 115, respectively. The channel estimator 115 estimates a channel matrix between the transmission antennas of the signal transmission device and the reception antennas of the signal reception device and outputs the estimated channel matrix to the MIMO receiver 113.

The MIMO receiver 113 detects a reception signal vector and a transmission symbol vector by using the estimated channel matrix output from the channel estimator 115 in accordance with the signal detection scheme suggested in the present invention, calculates an LLR value of each transmission bit included in the detected transmission symbol vector, and outputs the calculated LLR values to the de-interleaver 117. The inside structure and the particular operation of the MIMO receiver 113 will be described below with reference to FIG. 2, so their particular descriptions will be omitted herein.

The de-interleaver 117 de-interleaves the LLR values output in the MIMO receiver 113 in accordance with a predetermined de-interleaving scheme and then outputs the de-interleaved LLR values to the channel decoder 119. The channel decoder 119 soft-decision decodes the LLR values output in the de-interleaver 117 and restores the soft-decision decoded LLR values to information bit stream of the transmission signal.

Next, the inside structure of the MIMO receiver 113 of FIG. 1 will be described with reference to FIG. 2.

Figure 2:
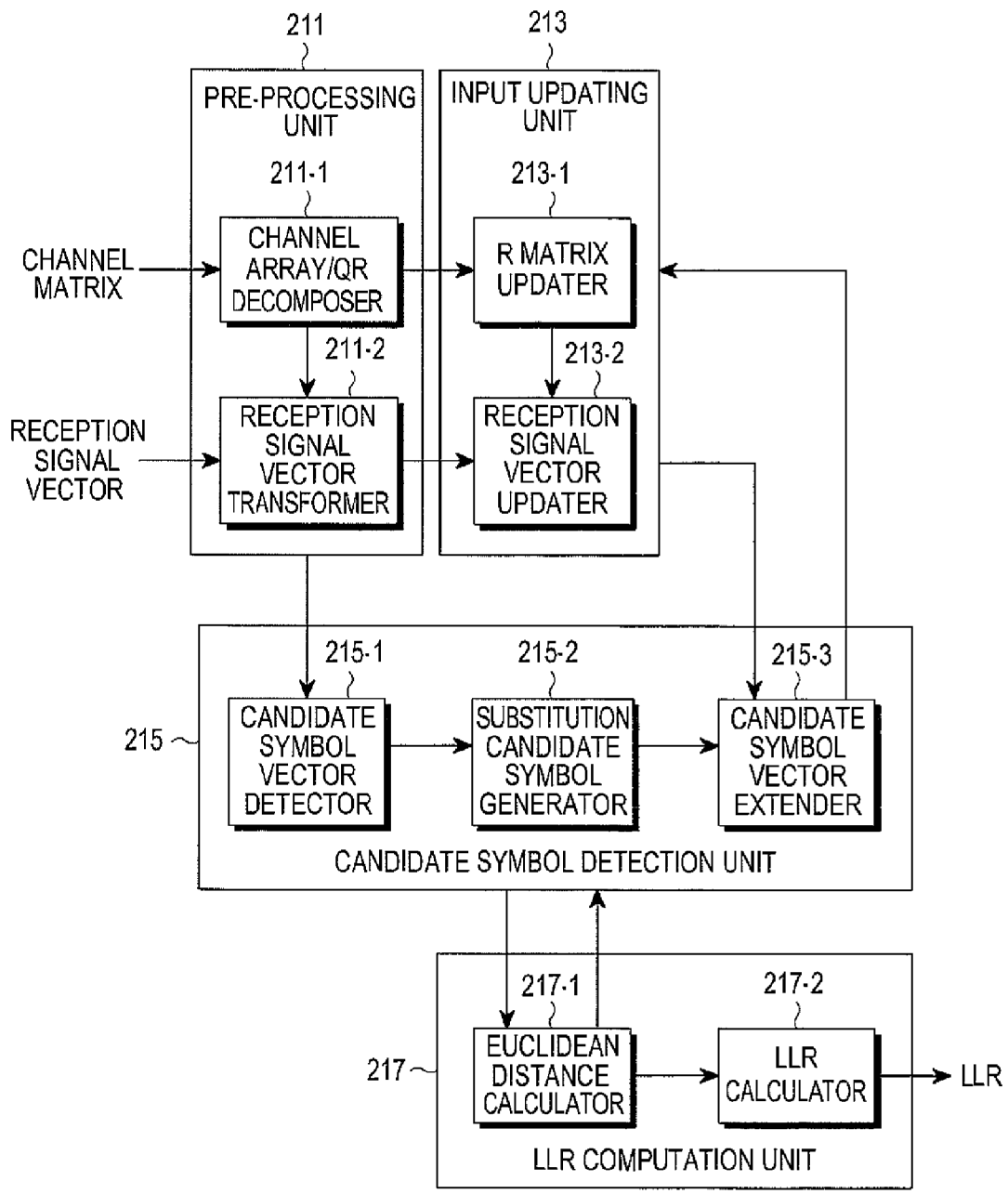
FIG. 2 illustrates an inside structure of a MIMO receiver of FIG. 1.

FIG. 2 is a diagram illustrating the inside structure of the MIMO receiver 113 of FIG. 1.

Referring to FIG. 2, the MIMO receiver 113 includes a pre-processing unit 211, an input updater 213, a candidate symbol detection unit 215, and an LLR computation unit 217. The pre-processing unit 211 includes a channel array/QR decomposer 211-1 and a reception signal vector transformation unit 211-2. The input updater 213 includes an R matrix updater 213-1 and a reception signal vector updater 213-2. The candidate symbol detection unit 215 includes a candidate symbol vector detector 215-1, a substitution candidate symbol generator 215-2, and a candidate symbol vector extender 215-3. Further, the LLR computation unit 217 includes a Euclidian distance calculator 217-1 and an LLR calculator 217-2.

First, the channel array/QR decomposer 211-1 QR decomposes the channel matrix in accordance with an array order and determines a detection order of the transmission symbol vector. Here, a QR decomposition process by the channel array/QR decomposer 211-1 can be defined by Equation (4) below.

$$R = 0, Q = H, p = [1, \ldots, N_T] \qquad \text{(Eqn. 4)}$$
$$\text{for } i = 1, \ldots, N_T$$
$$\quad norm_i = \|q_i\|^2$$
$$\text{end}$$
$$\text{for } i = 1, \ldots, N_T$$
$$\quad \text{if } (i == N_T)$$
$$\quad\quad l = 1$$
$$\quad \text{else}$$
$$\quad\quad l = \arg\min_{j=i,\ldots,N^T} 2nd\,(norm_j)$$

-continued end $l = l + i - 1$ exchange columns $i$ and $l$ in $R$, $p$, norm, and $Q$ $r_{ii} = \sqrt{norm_i}$ $q_i = q_i / r_{i,i}$ for $k = i+1, \ldots, N^T$ $r_{i,k} = q_i^H \cdot q_k$ $q_k = q_k - r_{i,k} \cdot q_i$ $norm_k = norm_k - |r_{i,k}|^2$ end end In Equation (4), a row vector p represents the order in which columns of the channel matrix H are arrayed.

The candidate symbol vector detector 215-1 detects transmission symbols transmitted via corresponding transmission antennas in an order from the rightmost value to the leftmost value of the row vector p.

In Equation (4), $q_i$ represents the $i^{th}$ row vector of the Q matrix (i.e., the matrix Q) and $r_{i,k}$ represents a value corresponding to the $i^{th}$ row and the $k^{th}$ column of the Q matrix. Further, in Equation (4), min2nd(.) is a function detecting the second smallest value, and outputs, in cooperation with the arg function, a row number corresponding to the second smallest value. As represented in Equation (4), the channel matrix H is QR decomposed by the array order corresponding to the order of the transmission antennas of the signal transmission device.

As represented in Equation (4), the R matrix (i.e., the matrix R) is initially set as a zero matrix and the Q matrix is initially set as the channel matrix H, and then the QR decomposition is initiated. The QR decomposition scheme is based on the MGS (Modified Gramm-Schmidt) orthogonalization scheme.

The if-else clause in Equation (4) is stated in order to first detect the transmission symbol from the signal received via the reception antenna estimated to have the poorest channel condition and detect the transmission symbol in an order of the estimated better channel condition thereafter. However, the channel array/QR decomposer 211-1 can channel array and QR decompose in a scheme identical to the if-else clause stated in Equation (4), without using the QR decomposition scheme represented in Equation (4).

Further, after passing the channel array/QR decomposer 211-1, the relation between the transmission symbol vector x, the reception signal vector y, the added noise vector n, and the channel matrix H defined in Equation (1) can be defined by Equation (5) below.

$Y = QRx + n$ (Eqn. 5)

In Equation (5), $Q^H Q = I$ and $$R = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix}.$$

In Equation (5), the Q matrix is a unitary matrix and has a property such that when the Q matrix is multiplied by its Hermitian matrix $Q^H$, the Q matrix becomes the identity matrix I. Further, the R matrix is an upper triangular matrix and has the morphological characteristic useful for the interference removal between the antennas.

The transmission symbol vector x is arrayed in $R = [x_1\ x_2\ x_3\ x_4]^T$, and is detected in an order of $x_4 \to x_3 \to x_2 \to x_1$.

Referring to FIG. 2, the reception signal vector transformation unit 211-2 multiplies the reception signal vector y by the Q matrix detected in the channel array/QR decomposer 211-1, to transform the reception signal vector as represented in Equation (6).

$$Q^H y = Rx + Q^H n \Leftrightarrow z = Rx + \tilde{n}$$ (6)

$$\begin{bmatrix} z_1 \\ z_2 \\ z_3 \\ z_4 \end{bmatrix} = \begin{bmatrix} r_{11} & r_{12} & r_{13} & r_{14} \\ 0 & r_{22} & r_{23} & r_{14} \\ 0 & 0 & r_{33} & r_{34} \\ 0 & 0 & 0 & r_{44} \end{bmatrix} \begin{bmatrix} x_1 \\ x_2 \\ x_3 \\ x_4 \end{bmatrix} + \begin{bmatrix} \tilde{n}_1 \\ \tilde{n}_2 \\ \tilde{n}_3 \\ \tilde{n}_4 \end{bmatrix}$$

In Equation (6), z represents a transformed reception signal vector.

Then, the candidate symbol vector detector 215-1 substitutes every transmittable candidate symbol for the transmission symbol $x_4$ corresponding to the first detection order. That is, when the signal transmission devices use the 64 QAM scheme, the candidate symbol vector detector 215-1 substitutes a total of 64 candidate symbols for the transmission symbol $x_4$ corresponding to the first detection order.

Next, the candidate symbol vector detector 215-1 sequentially removes the interference for $z_3$, $z_2$, and $z_1$ and detects the candidate symbols for $x_3$, $x_2$, and $x_1$ from each of the candidate symbols substituted for the transmission symbol $x_4$ by using the characteristic of the R matrix. The operation of the interference removal and the symbol detection can be defined by Equation (7) below.

$z_{\{-3\}} = z_3 - r_{34} x_4 \Rightarrow x_3 = Q(z_{\{-3\}}/r_{33})$ $z_{\{-2\}} = z_2 - r_{23} x_3 - r_{24} x_4 \Rightarrow x_2 = Q(z_{\{-2\}}/r_{22})$ $z_{\{-1\}} = z_1 - r_{12} x_2 - r_{13} x_3 - r_{14} x_4 \Rightarrow x_1 = Q(z_{\{-1\}}/r_{11})$ (Eqn. 7)

In Equation (7), formulae on the left side of the arrow represent the interference removal operations and $z_{\{-1\}}$, $z_{\{-2\}}$, and $z_{\{-3\}}$ represent signals in which the interference is removed from $z_1$, $z_2$, and $z_3$, respectively. In Equation (7), formulae on the right side of the arrow represent the symbol detection operation, and Q(•) represents a slicing operation.

Next, the candidate symbol vector detector 215-1 combines each of the candidate symbols substituted for the transmission symbol $x_4$ with the candidate symbols for the detected $x_3$, $x_2$, and $x_1$, to generate a candidate symbol vector. Herein, the total number of candidate symbols substituted for the transmission symbol $x_4$ is 64, so that a total of 64 candidate symbol vectors are generated.

The Euclidean distance calculator 217-1 calculates square values of the Euclidean distances between the candidate symbol vector and the reception signal vector generated in the candidate symbol vector detector 215-1 and stores the calculated values.

The candidate symbol vector detector 215-1 selects a candidate symbol vector having the smallest square value of the Euclidean distance calculated in the Euclidean distance calculator 217-1 among the generated candidate symbol vectors.

The substitution candidate symbol generator 215-2 generates the substitution candidate symbols for $x_3$, $x_2$, and $x_1$ by using the candidate symbol vector selected in the candidate symbol vector detector 215-1. According to a method for generating the substitution candidate symbols, the substitution candidate symbol generator 215-2 generates the symbols around each of the candidate symbols corresponding to $x_3$, $x_2$, and $x_1$ from the selected candidate symbol vectors, but it prevents the incurrence of the problem that the Euclidean distance necessary for calculation of the LLR value for each transmission bit by the LLR calculator 217-2 is null. That is, when the selected candidate symbol and the generated substitution candidate symbols are expressed bit by bit, the substitution candidate symbol generator 215-2 generates the substitution candidate symbols such that the situation in which the values of $x_3$, $x_2$, and $x_1$ for each bit are 0 and the situation in which the values of $x_3$, $x_2$, and $x_1$ for each bit are 1 exist.

Next, the method for generating the substitution candidate symbols by the substitution candidate symbol generator 215-2 of FIG. 2 will be described with reference to FIGS. 3A to 3G.

FIGS. 3A to 3G are views schematically illustrating the method for generating the substitution candidate symbols by the substitution candidate symbol generator 215-2 of FIG. 2.

Referring to FIGS. 3A to 3G, on an assumption that the selected candidate symbol is indicated with x on the constellation, the selected candidate symbol is expressed as 010000 in the bit unit.

Figure 3A:
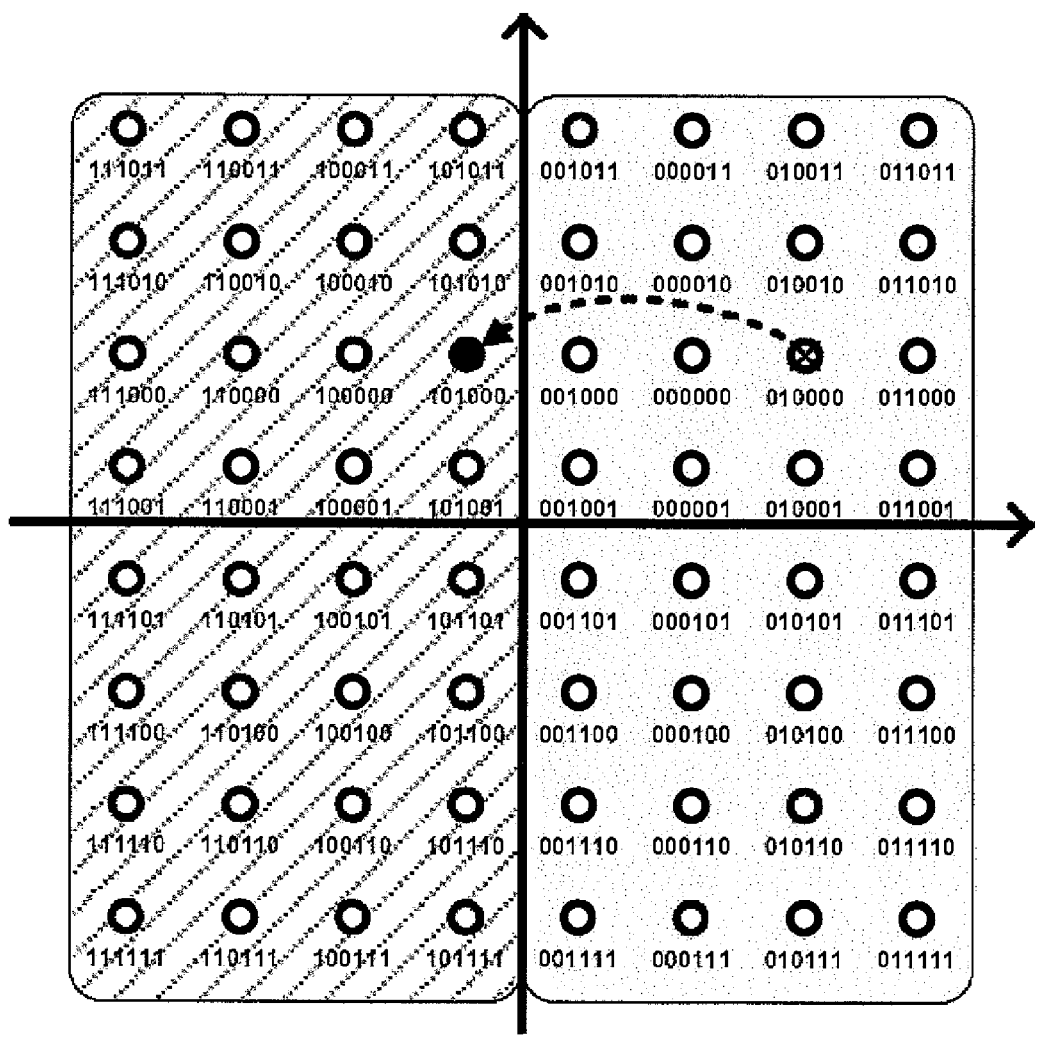
FIGS. 3A to 3G schematically illustrate a method for generating substitution candidate symbols by a substitution candidate symbol generator of FIG. 2.

As illustrated in FIG. 3A, the substitution candidate symbol generator 215-2 generates 101000, which is the closest symbol to the selected candidate symbol, among the symbols in which the first bit has a reverse value 1, as the substitution candidate symbol.

Figure 3B:
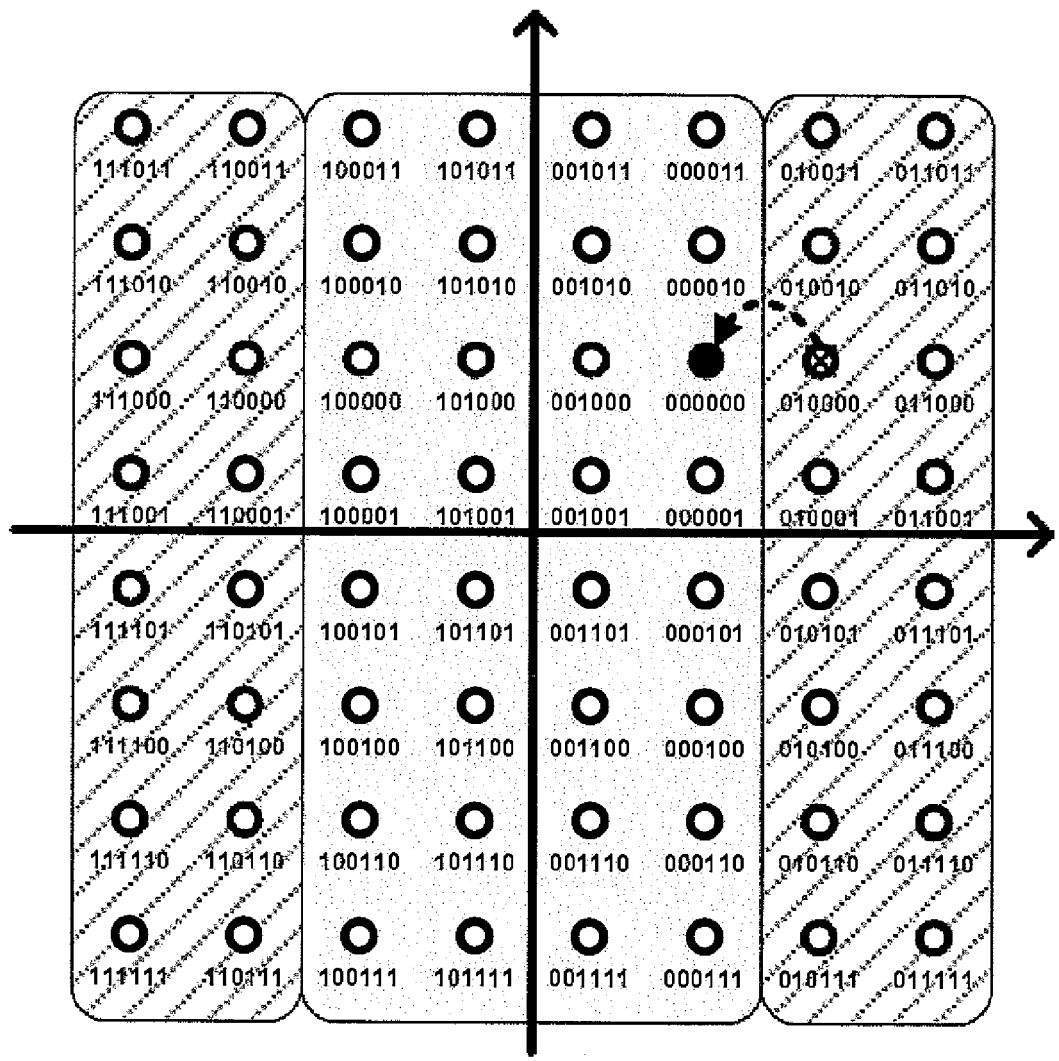

As illustrated in FIG. 3B, the substitution candidate symbol generator 215-2 generates 000000, which is the closest symbol to the selected candidate symbol, among the symbols in which the second bit has a reverse value 0, as the substitution candidate symbol.

Figure 3C:
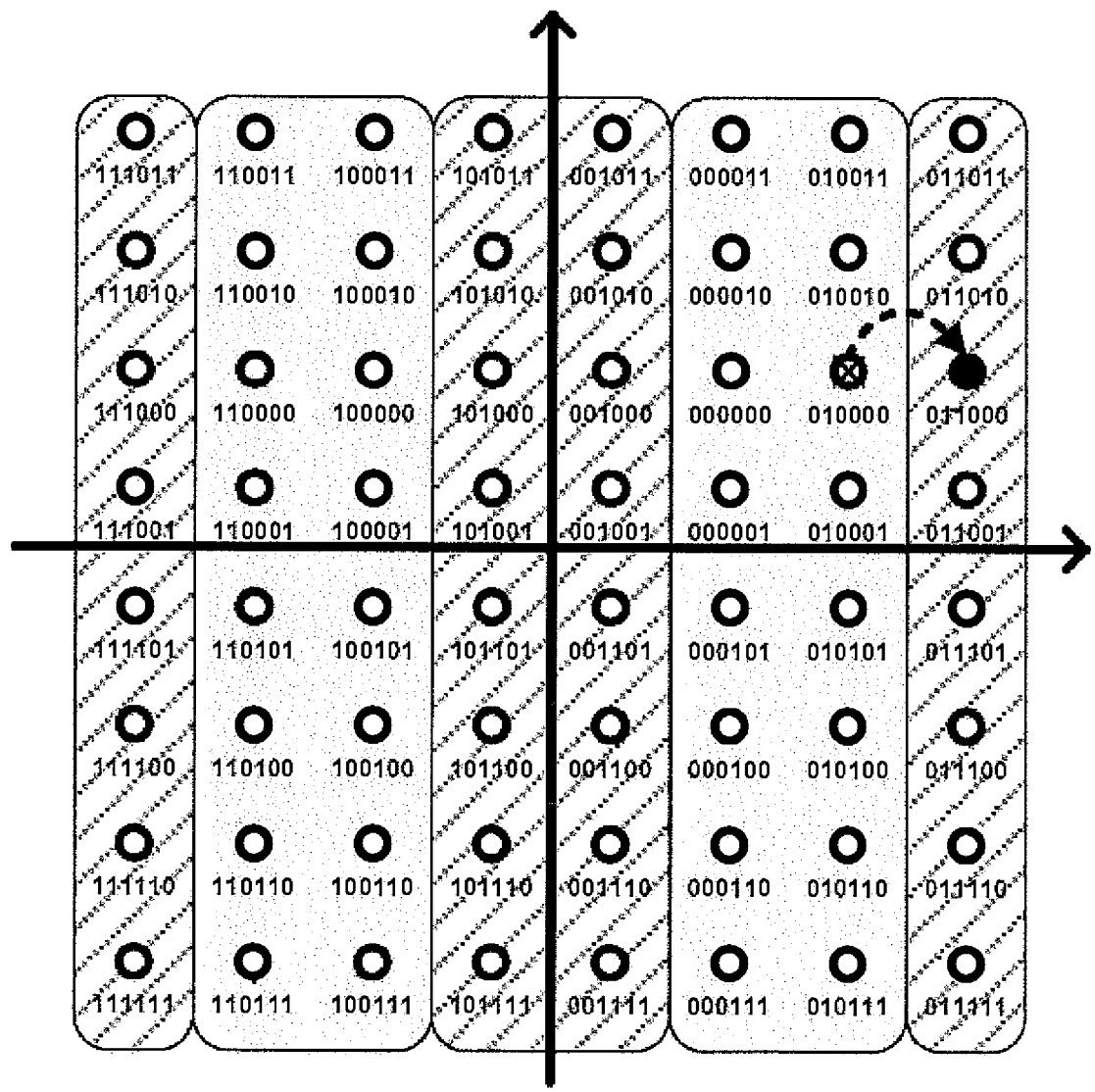

As illustrated in FIG. 3C, the substitution candidate symbol generator 215-2 generates 011000, which is the closest symbol to the selected candidate symbol, among the symbols in which the third bit has a reverse value 1, as the substitution candidate symbol.

Figure 3D:
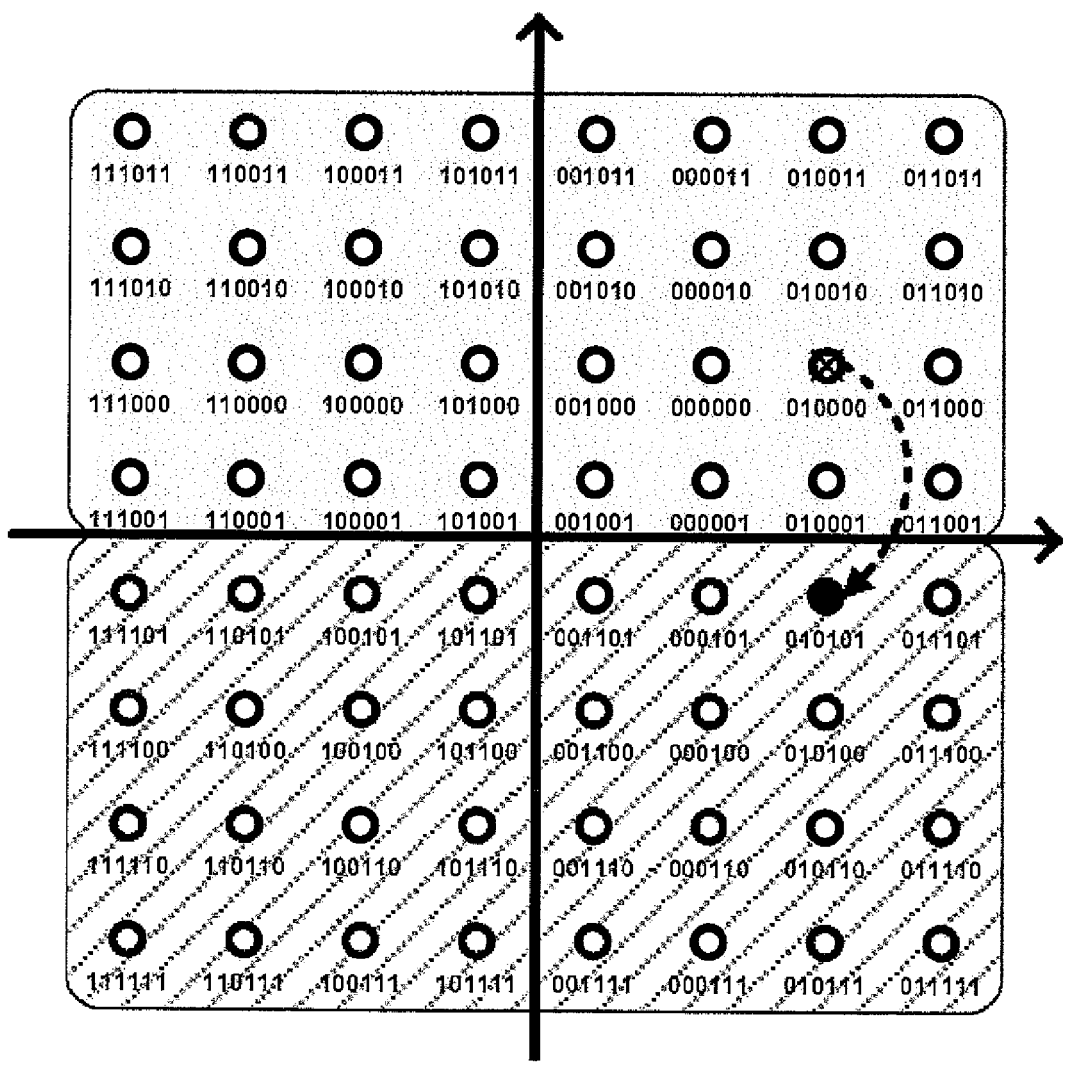

As illustrated in FIG. 3D, the substitution candidate symbol generator 215-2 generates 010101, which is the closest symbol to the selected candidate symbol, among the symbols in which the fourth bit has a reverse value 1, as the substitution candidate symbol.

Figure 3E:
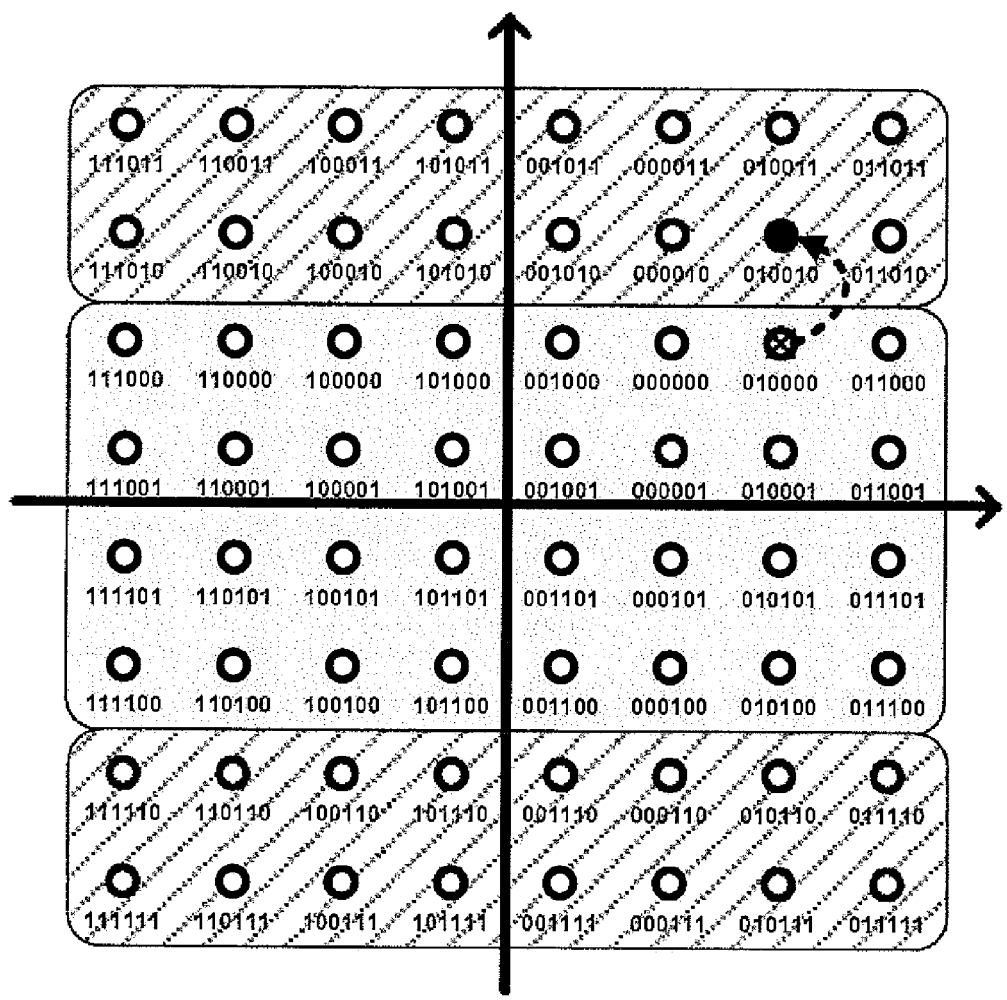

As illustrated in FIG. 3E, the substitution candidate symbol generator 215-2 generates 010010, which is the closest symbol to the selected candidate symbol, among the symbols in which the fifth bit has a reverse value 1, as the substitution candidate symbol.

Figure 3F:
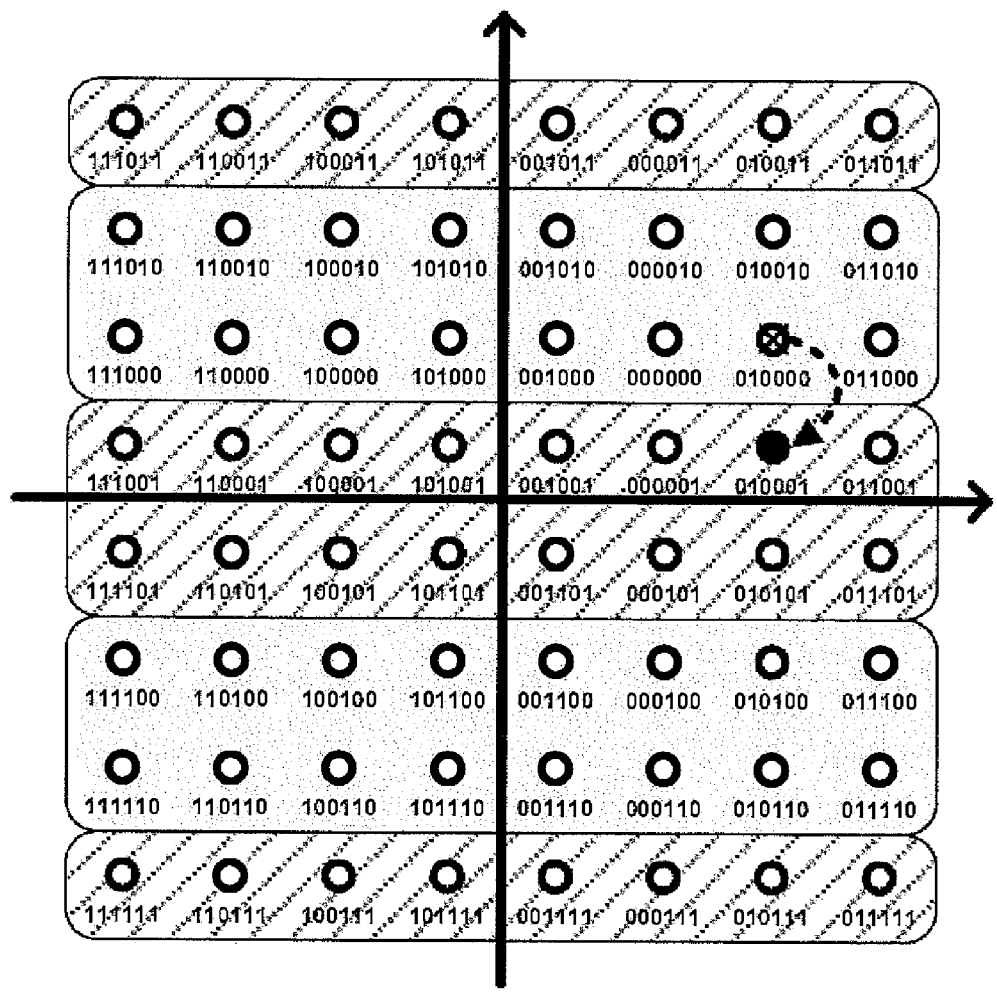

As illustrated in FIG. 3F, the substitution candidate symbol generator 215-2 generates 010001, which is the closest symbol to the selected candidate symbol, among the symbols in which the sixth bit has a reverse value 1, as the substitution candidate symbol.

Figure 3G:
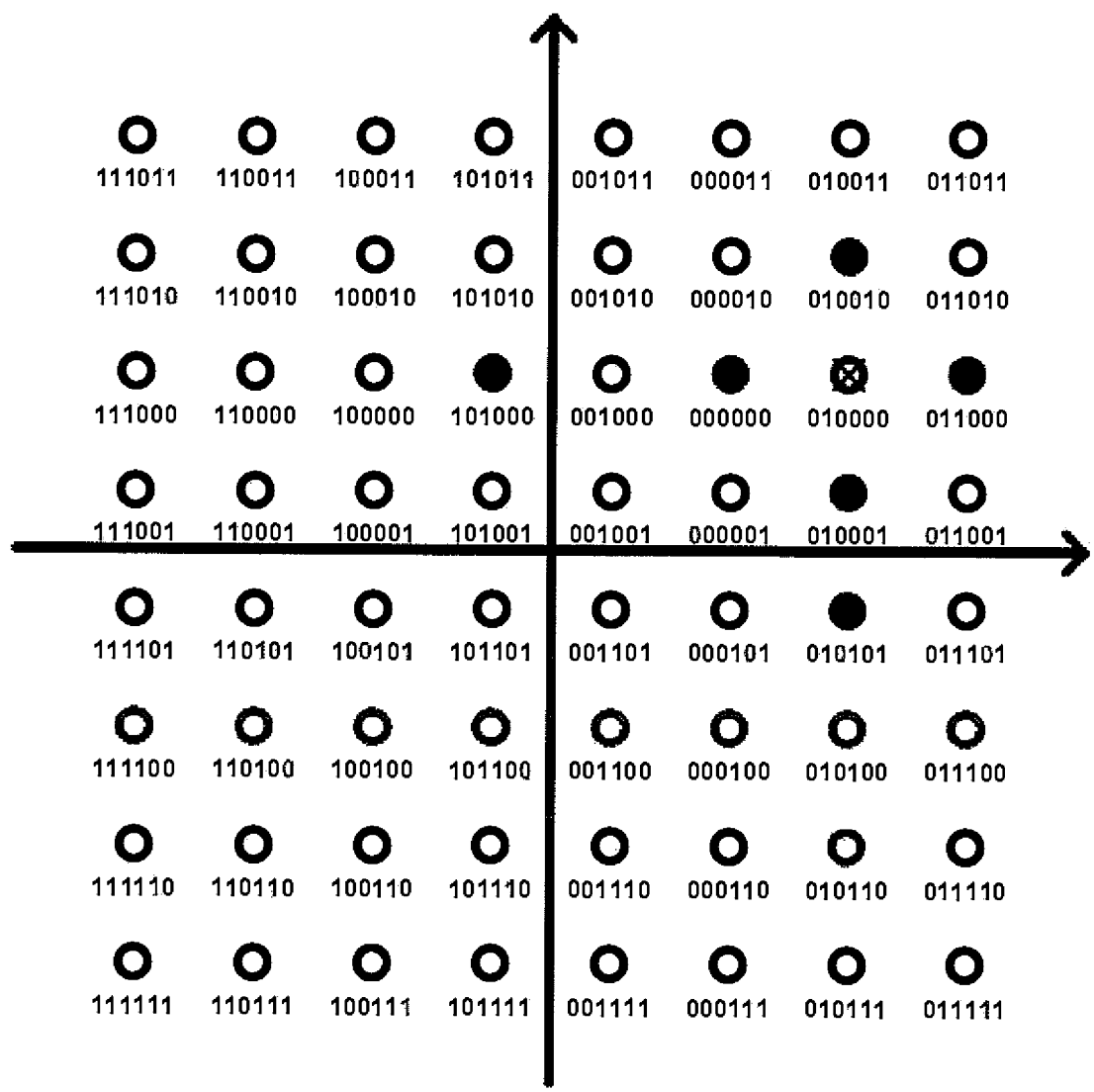

FIG. 3G illustrates all of the substitution candidate symbols generated in FIGS. 3A to 3F, and represents the generation of a total of 6 substitution candidate symbols.

The method for generating the substitution candidate symbols described with reference to FIGS. 3A to 3G can be defined by Equation (8).

$$x_i = \Re(x_i) + j \cdot \Im(x_i), \quad \text{(Eqn. 8)}$$

in which $i = 1, 2$, and $3$, $\Re(x_i) \in \{\pm 1, \pm 3, \pm 5, \pm 7\}$, and $\Im(x_i) \in \{\pm 1, \pm 3, \pm 5, \pm 7\}$.

if $|\Re(x_i)| == 1 \Rightarrow \begin{cases} x_{i,1} = (\Re(x_i) + 2 \cdot \text{sign}(\Re(x_i))) + j \cdot \Im(x_i) \\ x_{i,2} = (\Re(x_i) - 2 \cdot \text{sign}(\Re(x_i))) + j \cdot \Im(x_i) \\ x_{i,3} = (\Re(x_i) + 4 \cdot \text{sign}(\Re(x_i))) + j \cdot \Im(x_i) \end{cases}$ else if $|\Re(x_i)| == 3 \Rightarrow \begin{cases} x_{i,1} = (\Re(x_i) + 2 \cdot \text{sign}(\Re(x_i))) + j \cdot \Im(x_i) \\ x_{i,2} = (\Re(x_i) - 2 \cdot \text{sign}(\Re(x_i))) + j \cdot \Im(x_i) \\ x_{i,3} = (\Re(x_i) - 4 \cdot \text{sign}(\Re(x_i))) + j \cdot \Im(x_i) \end{cases}$ else if $|\Re(x_i)| == 5 \Rightarrow \begin{cases} x_{i,1} = (\Re(x_i) + 2 \cdot \text{sign}(\Re(x_i))) + j \cdot \Im(x_i) \\ x_{i,2} = (\Re(x_i) - 2 \cdot \text{sign}(\Re(x_i))) + j \cdot \Im(x_i) \\ x_{i,3} = (\Re(x_i) - 6 \cdot \text{sign}(\Re(x_i))) + j \cdot \Im(x_i) \end{cases}$ else if $|\Re(x_i)| == 7 \Rightarrow \begin{cases} x_{i,1} = (\Re(x_i) - 2 \cdot \text{sign}(\Re(x_i))) + j \cdot \Im(x_i) \\ x_{i,2} = (\Re(x_i) - 4 \cdot \text{sign}(\Re(x_i))) + j \cdot \Im(x_i) \\ x_{i,3} = (\Re(x_i) - 8 \cdot \text{sign}(\Re(x_i))) + j \cdot \Im(x_i) \end{cases}$ end if $|\Re(x_i)| == 1 \Rightarrow \begin{cases} x_{i,4} = \Re(x_i) + j \cdot (\Im(x_i) + 2 \cdot \text{sign}(\Im(x_i))) \\ x_{i,5} = \Re(x_i) + j \cdot (\Im(x_i) - 2 \cdot \text{sign}(\Im(x_i))) \\ x_{i,6} = \Re(x_i) + j \cdot (\Im(x_i) + 4 \cdot \text{sign}(\Im(x_i))) \end{cases}$ else if $|\Re(x_i)| == 3 \Rightarrow \begin{cases} x_{i,4} = \Re(x_i) + j \cdot (\Im(x_i) + 2 \cdot \text{sign}(\Im(x_i))) \\ x_{i,5} = \Re(x_i) + j \cdot (\Im(x_i) - 2 \cdot \text{sign}(\Im(x_i))) \\ x_{i,6} = \Re(x_i) + j \cdot (\Im(x_i) - 4 \cdot \text{sign}(\Im(x_i))) \end{cases}$ else if $|\Re(x_i)| == 5 \Rightarrow \begin{cases} x_{i,4} = \Re(x_i) + j \cdot (\Im(x_i) + 2 \cdot \text{sign}(\Im(x_i))) \\ x_{i,5} = \Re(x_i) + j \cdot (\Im(x_i) - 2 \cdot \text{sign}(\Im(x_i))) \\ x_{i,6} = \Re(x_i) + j \cdot (\Im(x_i) - 6 \cdot \text{sign}(\Im(x_i))) \end{cases}$ else if $|\Re(x_i)| == 7 \Rightarrow \begin{cases} x_{i,4} = \Re(x_i) + j \cdot (\Im(x_i) - 2 \cdot \text{sign}(\Im(x_i))) \\ x_{i,5} = \Re(x_i) + j \cdot (\Im(x_i) - 4 \cdot \text{sign}(\Im(x_i))) \\ x_{i,6} = \Re(x_i) + j \cdot (\Im(x_i) - 8 \cdot \text{sign}(\Im(x_i))) \end{cases}$ end In Equation (8), $\Re(\cdot)$ and $\Im(\cdot)$ represent a real part and an imaginary part of a complex number, respectively, $\text{sign}(\cdot)$ represents a function outputting 1 in the event of the positive sign and $-1$ in the event of the negative sign, and $x_{i,k}$ represents the $k^{th}$ substitution candidate symbol generated from the selected candidate symbol $x_i$.

As represented in Equation (8), the selected candidate symbol is separated into a real part and an imaginary part, and when the normalized factor is not considered, each of the real part and the imaginary part is one of $\pm 1$, $\pm 3$, $\pm 5$, and $\pm 7$. Herein, the first three substitution candidate symbols $x_{i,1}$, $x_{i,2}$, and $x_{i,3}$ are generated by fixing the imaginary part of the selected candidate symbol and calculating values of the real parts of the substitution candidate symbols according to the value of the real part. The next three substitution candidate symbols $x_{i,4}$, $x_{i,5}$, and $x_{i,6}$ are generated by fixing the real part of the selected candidate symbol and calculating values of the imaginary parts of the substitution candidate symbols according to the value of the imaginary part.

By using Equation (8), it is possible to very simply generate the substitution candidate symbol from the selected candidate symbol with an adder, without using a separate ROM (Read Only Memory) table, and the like.

FIGS. 3A to 3G and Equation (8) illustrate a method for generating the substitution candidate symbols where the signal transmission device uses the 64 QAM scheme as the modulation scheme, however the number of substitution candidate symbols and the generation method of the substitution candidate symbols can be changed depending on the modulation scheme, the reception performance, and the like.

The candidate symbol vector extender 215-3 changes an order of the detection of the transmission symbol vector and detects an additional candidate symbol vector.

According to the method of changing the order of the detection of the transmission symbol vector by the candidate symbol vector extender 215-3, which is different from the array of the transmission symbol vector x in $[x_1 \ x_2 \ x_3 \ x_4]^T$ and the detection of the transmission symbol vector in the order of $x_4 \rightarrow x_3 \rightarrow x_2 \rightarrow x_1$ by the candidate symbol vector detector 215-1, multiple detection orders are determined so that each of $x_3$, $x_2$, and $x_1$ can be detected for the first time.

Next, the re-arrayed transmission symbol vector and a changed detection order by the candidate symbol vector extender 215-3 of FIG. 2 will be described with reference to FIGS. 4A and 4B.

FIGS. 4A and 4B are diagrams schematically illustrating the re-arrayed transmission symbol vector and the changed detection order by the candidate symbol vector extender 215-3 of FIG. 2.

FIG. 4A represents the transmission symbol vector and the detection order in the candidate symbol vector detector 215-1 and FIG. 4B represents the re-arrayed transmission symbol vectors and the changed detection orders in such a manner as to detect $x_3$, $x_2$, and $x_1$ for the first time by the candidate symbol vector extender 215-3, respectively. In FIG. 4, it is assumed that a remaining order, other than the first detection order, among the detection orders are an order of the better channel condition.

With respect to each of the changed detection orders, the candidate symbol vector extender 215-3 substitutes the substitution candidate symbols generated in the substitution candidate generator 215-2 for the first detection order, and detects candidate symbols corresponding to the remaining detection orders in a same manner as the candidate symbol vector detector 215-1 and generates an additional candidate symbol vector.

Then, likewise the candidate symbol vector generated in the candidate symbol vector detector 215-1, the square value of the Euclidean distance between the reception signal vector and the candidate symbol vector generated in the candidate symbol vector extender 215-3 are calculated and stored in the Euclidean distance calculator 217-1.

The R matrix updater 213-1 and the reception signal vector updater 213-2 update the R matrix and the z vector (i.e., the vector z) generated in the channel array/QR decomposer 211-1 in accordance with the detection order changed in the candidate symbol vector extender 215-3, respectively, and output the updated R matrix and z vector to the candidate symbol vector extender 215-3.

By re-arraying the column of the channel matrix H in accordance with the detection order changed in the candidate symbol vector extender 215-3 and performing the QR decomposition, the R matrix and the z vector are updated as a newly generated R matrix and z vector. However, when the R matrix and the z vector are updated, an additional calculation is necessary due to the QR decomposition conducted for each of the detection orders.

Therefore, in order to solve the problem of the requirement of the additional operation in the updating of the R matrix and the z vector, the present invention suggests a method for updating the R matrix and the z vector by using an adjacent column exchange and a rotation transformation matrix.

First, the R matrix detected through the QR decomposition of the channel matrix H and an R' matrix detected through the QR decomposition of a channel matrix H' in which the $k^{th}$ column is exchanged with the $k-1^{th}$ column of the channel matrix H are considered. In this situation, it is possible to detect the R' matrix from the R matrix without the QR decomposition as represented in Equation (9).

Exchange column $k$ and $k-1$ in $R$. (Eqn. 9)

For the exchanged $R$, $$\alpha = \frac{r_{k-1,k-1}}{\sqrt{|r_{k-1,k}|^2 + |r_{k-1,k-1}|^2}}$$

$$\beta = \frac{r_{k,k-1}}{\sqrt{|r_{k-1,k}|^2 + |r_{k-1,k-1}|^2}}$$

if $k = 4, \Rightarrow \Theta = \begin{bmatrix} \alpha^* & \beta & 0 & 0 \\ -\beta & \alpha & 0 & 0 \\ 0 & 0 & 1 & 0 \\ 0 & 0 & 0 & 1 \end{bmatrix}$ else if $k = 3, \Rightarrow \Theta = \begin{bmatrix} 1 & 0 & 0 & 0 \\ 0 & 1 & 0 & 0 \\ 0 & 0 & \alpha^* & \beta \\ 0 & 0 & -\beta & \alpha \end{bmatrix}$ else if $k = 2, \Rightarrow \Theta = \begin{bmatrix} 1 & 0 & 0 & 0 \\ 0 & \alpha^* & \beta & 0 \\ 0 & -\beta & \alpha & 0 \\ 0 & 0 & 0 & 1 \end{bmatrix}$ end $R' = \Theta R \ z' = \Theta z$.

In Equation (9), z' represents the updated vector of the vector z in such a manner as to correspond to the column-exchanged R matrix. Equation (9) is provided where a size of the R matrix is 4×4, however the size of the R matrix can be changed according to the number of transmission antennas used in the signal transmission device and the number of reception antennas used in the signal reception device.

As represented in Equation (9), in order to detect the R' matrix, the $k^{th}$ column of the R matrix is exchanged with the $k-1^{th}$ column of the R matrix. Then, the values α and β are detected from the column-exchanged R matrix and a rotation transformation matrix Θ is generated according to the exchanged column number. The R' matrix and the z' vector generates the rotation transformation matrix Θ for the column-exchanged R matrix and the z vector, respectively. The R' matrix and the z' vector are detected through multiplying each of the column-exchanged R matrix and the z vector by the rotation transformation matrix Θ.

The R matrix updater 213-1 and the reception signal vector updater 213-2 can update the R matrix and the z vector in accordance with the changed detection order by sequentially using the method represented in Equation (9).

Next, a method for detecting detection orders of the candidate symbol vector extender 215-3 from a detection order of the candidate symbol vector detector 215-1 by using the sequential adjacent column exchange will be described with reference to FIGS. 5A to 5C.

Figure 5A:
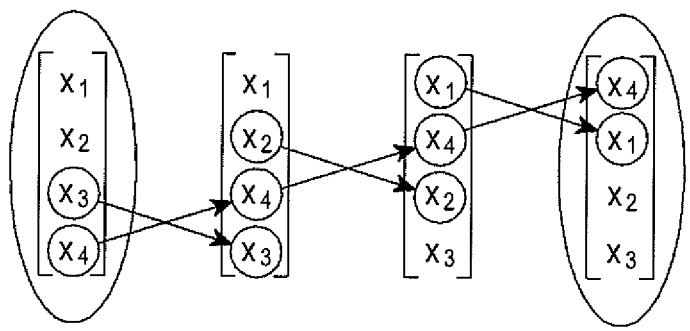
FIGS. 5A to 5C illustrate a method for detecting detection orders of a candidate symbol vector extender from a detection order of a candidate symbol vector detector by using a sequential adjacent column exchange.
Figure 5B:
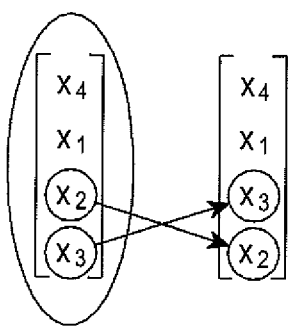
Figure 5C:
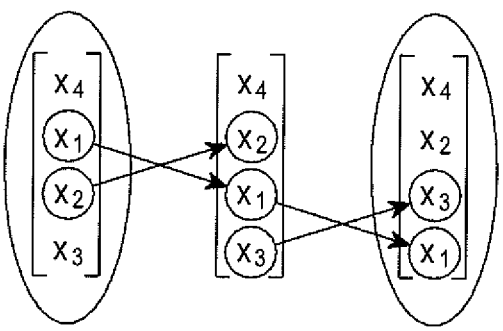

FIGS. 5A to 5C are diagrams schematically illustrating a method for detecting detection orders of the candidate symbol vector extender 215-3 from a detection order of the candidate symbol vector detector 215-1 by using the sequential adjacent column exchange.

In FIG. 5A, the transmission symbol vector within a left oval is in accordance with the detection order of the candidate symbol vector detector 215-1, so that the transmission symbol vector within the left oval is transformed to the transmission symbol vector within a right oval in accordance with the detection order changed through the adjacent column exchanges three times, the transmission symbol vector within the right oval is identical to $x_1$ of FIG. 4B. In FIG. 5B, the transmission symbol vector within a left oval is $x_1$ of FIG. 4B, so that it is possible to obtain $x_2$ of FIG. 4B through the adjacent column exchange one time. In FIG. 5C, the transmission symbol vector within a left oval is $x_1$ of FIG. 4B, so that it is possible to obtain $x_3$ of FIG. 4B through the adjacent column exchanges two times. Therefore the R matrix and the z vector updated in accordance with the detection order changed by the candidate symbol vector extender 215-3 are obtained by 6 times adjacent column exchanges.

As described above, the update scheme of the R matrix and the z vector by using the adjacent column exchange and the rotation transformation matrix has the improved efficiency in an aspect of the calculation quantity in comparison with the method for newly detecting the R matrix and the z vector through the re-array of the column of the channel matrix H and the QR decomposition. The reasons are as follows.

First, in the multiplication of the R matrix and the z vector by the rotation transformation matrix Θ, the rotation transformation matrix Θ includes many elements having a value of 0 or 1, so that a large quantity of the calculations can be removed.

Second, the value of β included in the rotation transformation matrix Θ is a real number, not a complex number, so that the quantity of the calculations is smaller than that of the multiplication of the complex number.

Finally, contrary to the QR decomposition, the process for detecting the rotation transformation matrix Θ, which is not necessary in the symbol detection, is not included, so that the quantity of calculation for detecting the rotation transformation matrix Θ can be removed.

Table 1 represents the number of times of real number multiplication, real number addition, real number division, and calculation of a square root using the QR decomposition and the adjacent column exchange and the rotation transformation matrix in the updating of the R matrix and the z vector in accordance with the three detection orders changed in the candidate symbol vector extender 215-3.

TABLE 1

| | Using QR decomposition | Using adjacent column exchange and rotation transformation matrix |
|---|---|---|
| Real number multiplication | 864 | 156 |
| Real number addition | 648 | 98 |
| Real number division | 96 | 18 |
| Square root | 12 | 6 |

The LLR calculator 217-2 calculates the LLR value for each transmission bit as defined in Equation 10 below by using the square value of the Euclidean distance output from the Euclidian distance calculator 217-1.

$$LLR(b_i) = \sqrt{\min_{x \in \hat{S}_{i,1}} \|y - Hx\|^2} - \sqrt{\min_{x \in \hat{S}_{i,0}} \|y - Hx\|^2} \quad \text{(Eqn. 10)}$$

In Equation (10), and $\hat{S}_{i,0}$ and $\hat{S}_{i,1}$ represent candidate symbol vector sets, in which a value of the $i^{th}$ bit is 0 or 1, among all of the candidate symbol vector sets detected from the candidate symbol vector detector 215-1 and the candidate symbol vector extender 215-3. As described above, the situation is not incurred in which $\hat{S}_{i,0}$ and $\hat{S}_{i,1}$ are null for every bit in the embodiment of the present invention.

Contrary to Equation (3), a calculation of a square root is added in Equation (10) so as to release the deterioration of the reception performance which may be incurred due to the fact that $\hat{S}_{i,0}$ and $\hat{S}_{i,1}$ have not been detected from all of the transmittable symbol vector sets, but detected from the candidate symbol vector set according to the embodiment of the present invention.

Next, an operation of the MIMO receiver 113 will be described with reference to FIGS. 6A and 6B.

Figure 6A:
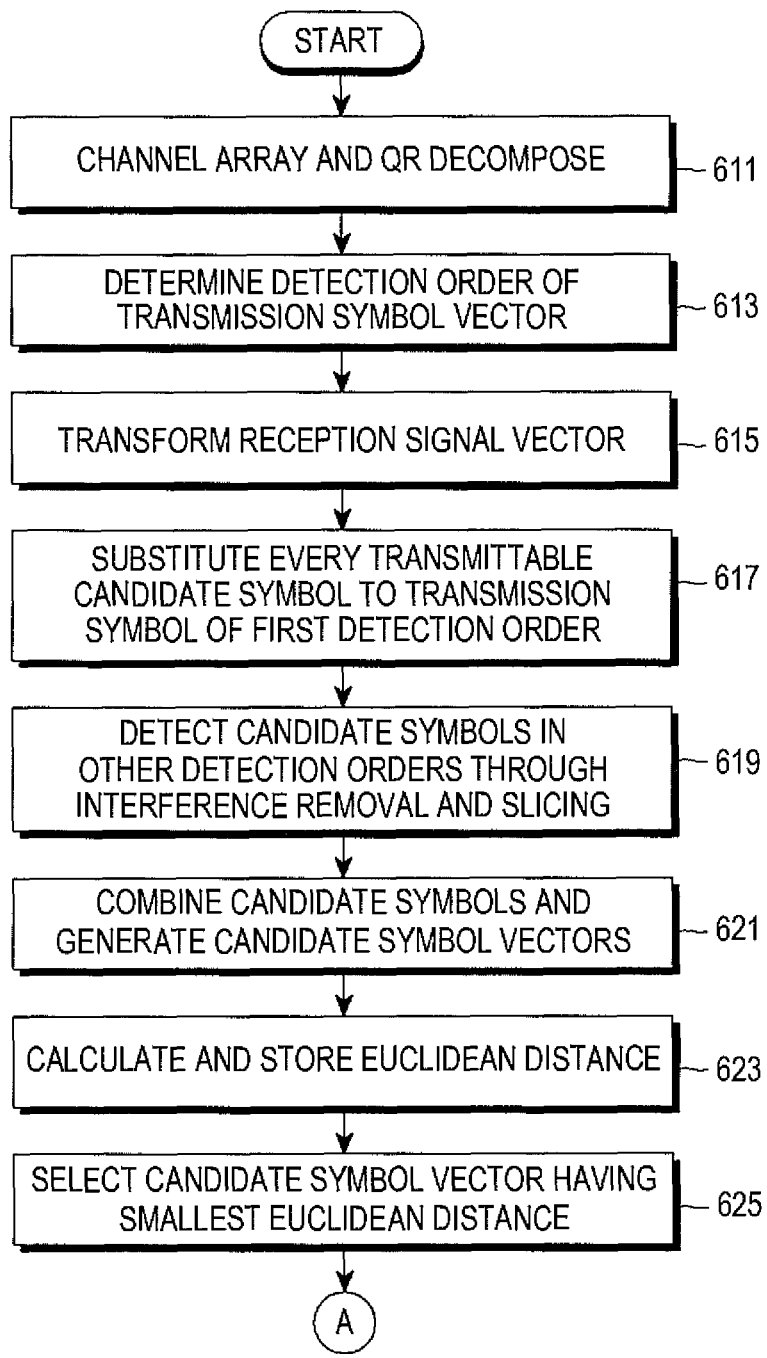
FIGS. 6A and 6B illustrate an operation of a MIMO receiver of FIG. 1.
Figure 6B:
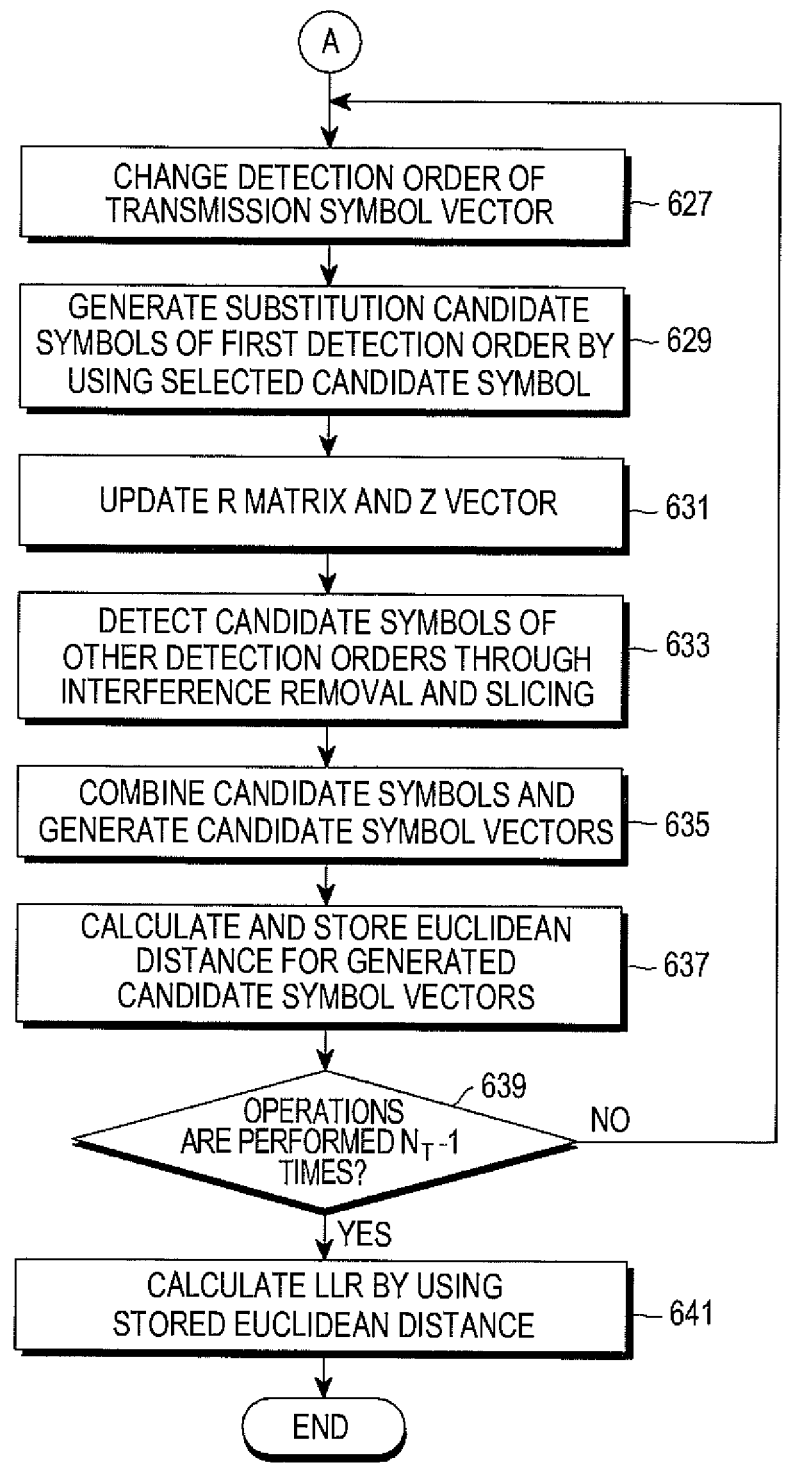

FIGS. 6A and 6B are flowcharts illustrating the operation of the MIMO receiver 113 of FIG. 1.

Referring to FIGS. 6A and 6B, in block 611, the MIMO receiver 113 channel-arrays and QR decomposes. In block 613, the MIMO receiver 113 determines an order of the detection of the transmission symbol vector. In block 615, the MIMO receiver 113 QR decomposes and transforms the reception signal vector. In block 617, the MIMO receiver 113 substitutes every transmittable candidate symbol to the transmission symbol in the first detection order. In block 619, the MIMO receiver 113 detects candidate symbols in the remaining detection orders through the interference removal and the slicing. In block 621, the MIMO receiver 113 combines the candidate symbols and generates the candidate symbol vectors.

In block 623, the MIMO receiver 113 calculates and stores the Euclidean distance for the generated candidate symbol vectors. In block 625, the MIMO receiver 113 selects the candidate symbol vector having the smallest Euclidean distance. In block 627, the MIMO receiver 113 changes the detection order of the transmission symbol vector. In block 629, the MIMO receiver 113 generates the substitution candidate symbols of the first detection order by using the selected candidate symbol. In block 631, the MIMO receiver 113 updates the R matrix and the z vector.

In block 633, the MIMO receiver 113 removes the interference and performs the slicing, to detect the candidate symbols of the remaining detection orders. In block 635, the MIMO receiver 113 combines the candidate symbols and generates the candidate symbol vectors. In block 637, the MIMO receiver 113 calculates and stores the Euclidean distance for the generated candidate symbol vectors. In block 639, the MIMO receiver 113 examines if the operations of blocks 627 to 637 are performed $N_T-1$ times. Herein, $N_T-1$ refers to the number of candidate symbol vectors. When the operations of blocks 627 to 637 are not performed $N_T-1$ times as a result of the examination, the MIMO receiver 113 returns to block 627.

However, when the operations of blocks 627 to 637 are performed NT-1 times as a result of the examination, the MIMO receiver 113 proceeds to block 641. In block 641, the MIMO receiver 113 calculates the LLR by using the stored Euclidean distance.

Next, the performance of the MIMO receiver according to the embodiment of the present invention will be described with reference to FIG. 7.

Figure 7:
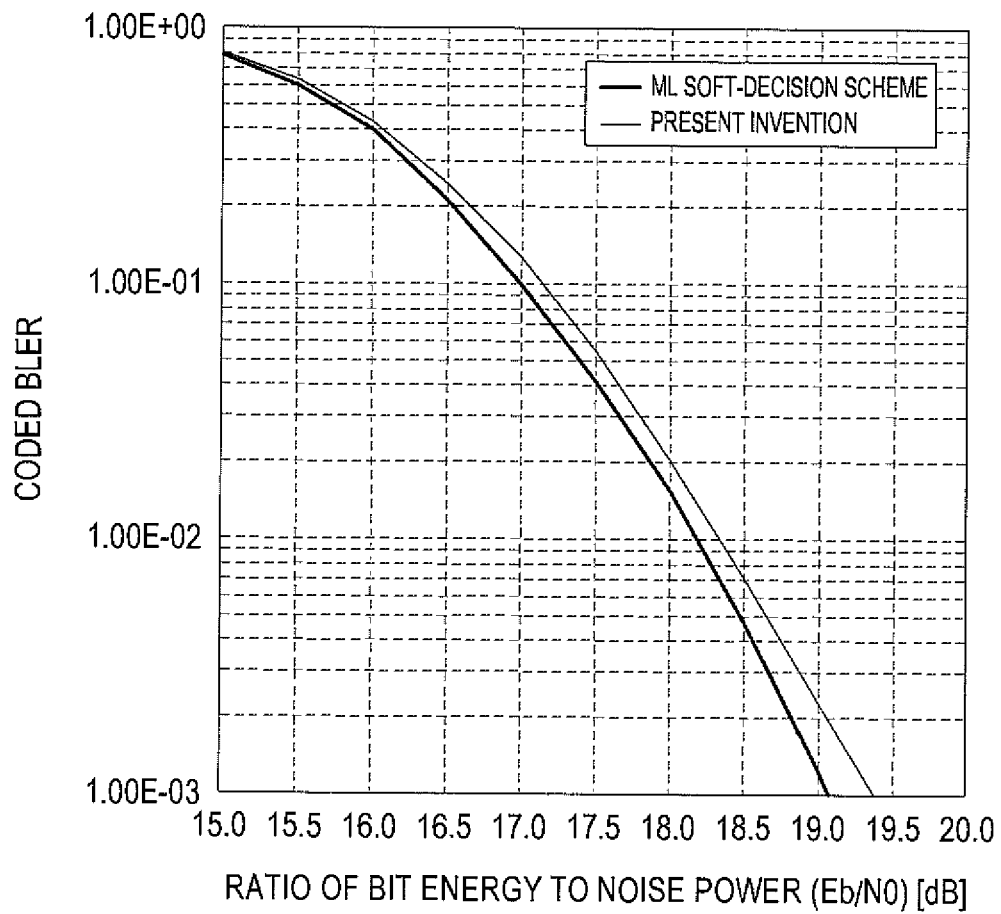
FIG. 7 illustrate a performance of a MIMO receiver according to an embodiment of the present invention.

FIG. 7 is a graph illustrating the performance of the MIMO receiver according to the embodiment of the present invention.

The graph of FIG. 7 illustrates the performance of the MIMO receiver on an assumption that the number of transmission antennas is four, the number of reception antennas is four, the modulation scheme used in the signal transmission device is 64 QAM scheme, and a size of the transmission block is 480 bits.

Further, the graph of FIG. 7 illustrates the performance of the MIMO receiver where the channel is the i. i. d. (independent and identically distributed) Rayleigh fading channel, the channel encoding scheme uses the CTC (Convolutional Turbo Code) having the coding rate of 5/6, and the number of repetition times of the turbo decoding is controlled by 6 times.

Referring to FIG. 7, a horizontal axis represents the ratio of the bit energy to the noise power (Eb/N0), and a vertical axis represents the Coded BLER (Block Error Rate). As illustrated in FIG. 7, the signal detection scheme suggested in the present invention shows the performance difference within the range from 0.01 [dB] to 0.2 [dB] of the Coded BLER in comparison with the ML-soft decision scheme having the optimum performance. Therefore, it can be noted that the signal detection scheme suggested in the present invention has the considerably low calculation complexity in comparison with the ML-soft decision scheme and the similar performance with the ML-soft decision scheme.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for detecting a signal in a Spatial Multiplexing Multiple Input Multiple Output (SM-MIMO) communication system, the method comprising:
   QR decomposing a reception signal vector and generating the QR decomposed reception signal vector as a transformed reception signal vector;
   substituting all of transmittable candidate symbols for a transmission symbol corresponding to a first detection order among transmission symbols included in a transmission symbol vector and sequentially removing interference in the transformed reception signal vector;
   detecting candidate symbols of transmission symbols corresponding to at least one second detection order different than the first detection order from the interference-removed transformed reception signal vector, combining the detected candidate symbols, and detecting candidate symbol vectors;
   generating a plurality of substitution candidate symbols by using the detected candidate symbol vectors;
   re-defining multiple detection orders of the transmission symbol vector in such a manner that the generated substitution candidate symbols are first detected, and updating the transformed reception signal vector according to the re-defined detection orders;
   substituting the generated substitution candidate symbols for the transmission symbol corresponding to the first detection order in each of the re-defined detection orders, and sequentially removing interference from the updated transformed reception signal vector; and
   calculating LLR (Log-Likelihood Ratio) values of bits included in the transmission symbols by using the detected candidate symbol vectors.

2. The method as claimed in claim 1, wherein the LLR values are calculated by:
   additionally extending candidate symbol vectors by using the plurality of substitution candidate symbols; and
   calculating the LLR values of bits included in the transmission symbols by using the extended candidate symbol vectors.

3. The method as claimed in claim 2, wherein generating the plurality of substitution candidate symbols by using the detected candidate symbol vectors comprises:
   calculating Euclidean distance values between each of the detected candidate symbol vectors and the reception signal vector;
   selecting a candidate symbol vector having the smallest Euclidean distance among the detected candidate symbol vectors; and
   generating the substitution candidate symbols corresponding to each of the first and second detection orders by using candidate symbols corresponding to the second detection order.

4. The method as claimed in claim 2, wherein additionally extending candidate symbol vectors by using the plurality of substitution candidate symbols comprises:
   detecting candidate symbols of transmission symbols corresponding to the second detection order from the interference-removed transformed reception signal vector, combining the detected candidate symbols, and additionally extending candidate symbol vectors.

5. The method as claimed in claim 4, wherein calculating LLR values of bits included in the transmission symbols by using the extended candidate symbol vectors comprises:
   calculating Euclidean distance values between each of the extended candidate symbol vectors and the reception signal vector; and
   calculating LLR values of bits included in the transmission symbols by using the calculated Euclidean distance values.

6. The method as claimed in claim 5, wherein the LLR values are defined by the Equation, $$LLR(b_i) = \sqrt{\min_{x \in \hat{S}_{i,1}} \|y - Hx\|^2} - \sqrt{\min_{x \in \hat{S}_{i,0}} \|y - Hx\|^2},$$

wherein, $\hat{S}_{i,0}$ and $\hat{S}_{i,1}$ represent candidate symbol vectors sets in which a value of the $i^{th}$ bit is 0 or 1 among extended candidate symbol vector sets, y represents the reception signal vector, H represents a channel matrix, and x represents the transmission symbol vector.

7. The method as claimed in claim 5, wherein generating the substitution candidate symbols comprises generating a symbol, which is the closest to a corresponding candidate symbol among symbols having a value reverse to a value of the corresponding bit for each of bits included in the corresponding candidate symbol, as a substitution candidate symbol.

8. An apparatus for detecting a signal in a Spatial Multiplexing Multiple Input Multiple Output (SM-MIMO) communication system, the apparatus comprising:
a reception signal vector transformer configured to QR decompose a reception signal vector and generate the QR decomposed reception signal vector as a transformed reception signal vector;
a candidate symbol vector detector configured to substitute all of transmittable candidate symbols for a transmission symbol corresponding to a first detection order among transmission symbols included in a transmission symbol vector, sequentially remove interference in the transformed reception signal vector, detect candidate symbols of transmission symbols corresponding to at least one second detection order different than the first detection order from the interference-removed transformed reception signal vector, combine the detected candidate symbols, and detect candidate symbol vectors;
a substitution symbol generator configured to generate a plurality of substitution candidate symbols by using the detected candidate symbol vectors;
a reception signal vector updater configured to re-define multiple detection orders of the transmission symbol vector in such a manner that the generated substitution candidate symbols are first detected, and updating the transformed reception signal vector according to the re-defined detection orders;
a candidate symbol vector extender configured to substitute the generated substitution candidate symbols for the transmission symbol corresponding to the first detection order in each of the re-defined detection orders, and sequentially remove interference from the updated transformed reception signal vector; and
an LLR computation unit configured to calculate LLR values of bits included in the transmission symbols by using the detected candidate symbol vectors.

9. The apparatus as claimed in claim 8, wherein the apparatus is configured to:
additionally extend candidate symbol vectors by using the plurality of substitution candidate symbols; and
calculate the LLR values of bits included in the transmission symbols by using the extended candidate symbol vectors.

10. The apparatus as claimed in claim 9, further comprising a Euclidean distance calculator configured to calculate Euclidean distance values between each of the detected candidate symbol vectors and the reception signal vector, in which
the substitution symbol generator selects a candidate symbol vector having the smallest Euclidean distance among the detected candidate symbol vectors and generates the substitution candidate symbols corresponding to each of the first and second detection orders by using candidate symbols corresponding to the second detection order.

11. The apparatus as claimed in claim 9, wherein
the candidate symbol vector extender detects candidate symbols of transmission symbols corresponding to the second detection order from the interference-removed transformed reception signal vector, combines the detected candidate symbols, and additionally extends candidate symbol vectors.

12. The apparatus as claimed in claim 11, wherein the LLR computation unit comprises:
a Euclidean distance calculator configured to calculate Euclidean distance values between each of the extended candidate symbol vectors and the reception signal vector; and
an LLR calculator configured to calculate LLR values of bits included in the transmission symbols by using the calculated Euclidean distance values.

13. The apparatus as claimed in claim 12, wherein the LLR values are defined by the Equation, $$LLR(b_i) = \sqrt{\min_{x \in \hat{S}_{i,1}} \|y - Hx\|^2} - \sqrt{\min_{x \in \hat{S}_{i,0}} \|y - Hx\|^2},$$

wherein, $\hat{S}_{i,0}$ and $\hat{S}_{i,1}$ represent candidate symbol vectors sets in which a value of the $i^{th}$ bit is 0 or 1 among extended candidate symbol vector sets, y represents the reception signal vector, H represents a channel matrix, and x represents the transmission symbol vector.

14. The apparatus as claimed in claim 12, wherein the substitution symbol generator generates a symbol, which is the closest to a corresponding candidate symbol among symbols having a value reverse to a value of the corresponding bit for each of bits included in the corresponding candidate symbol, as a substitution candidate symbol.

15. A Multiple Input Multiple Output (MIMO) receiver configured to detect a signal in a Spatial Multiplexing Multiple Input Multiple Output (SM-MIMO) communication system, the MIMO receiver comprising:
a pre-processing unit comprising:
a reception signal vector transformer configured to QR decompose a reception signal vector and generate the QR decomposed reception signal vector as a transformed reception signal vector;
a candidate symbol detection unit comprising a candidate symbol vector detector, the candidate symbol vector detector configured to substitute all of transmittable candidate symbols for a transmission symbol corresponding to a first detection order among transmission symbols included in a transmission symbol vector, sequentially remove interference in the transformed reception signal vector, detect candidate symbols of transmission symbols corresponding to at least one second detection order different than the first detection order from the interference-removed transformed reception signal vector, combine the detected candidate symbols, and detect candidate symbol vectors;
a substitution symbol generator configured to generate a plurality of substitution candidate symbols by using the detected candidate symbol vectors;
a reception signal vector updater configured to re-define multiple detection orders of the transmission symbol vector in such a manner that the generated substitution candidate symbols are first detected, and updating the transformed reception signal vector according to the re-defined detection orders;
a candidate symbol vector extender configured to substitute the generated substitution candidate symbols for the transmission symbol corresponding to the first detection order in each of the re-defined detection orders, and sequentially remove interference from the updated transformed reception signal vector; and an LLR computation unit configured to calculate LLR values of bits included in the transmission symbols by using the detected candidate symbol vectors.

16. The MIMO receiver as claimed in claim 15, wherein the MIMO receiver is configured to:
additionally extend candidate symbol vectors by using the plurality of substitution candidate symbols; and
calculate the LLR values of bits included in the transmission symbols by using the extended candidate symbol vectors.

17. The MIMO receiver as claimed in claim 16, further comprising a Euclidean distance calculator configured to calculate Euclidean distance values between each of the detected candidate symbol vectors and the reception signal vector, in which
the substitution symbol generator selects a candidate symbol vector having the smallest Euclidean distance among the detected candidate symbol vectors and generates the substitution candidate symbols corresponding to each of the first and second detection orders by using candidate symbols corresponding to the second detection order.

18. The MIMO receiver as claimed in claim 16, wherein the candidate symbol vector extender substitutes the generated substitution candidate symbols for the transmission symbol corresponding to the first detection order in each of the re-defined detection orders, sequentially removes interference from the updated reception signal, detects candidate symbols of transmission symbols corresponding to the second detection order from the interference-removed transformed reception signal vector, combines the detected candidate symbols, and additionally extends candidate symbol vectors.

19. The MIMO receiver as claimed in claim 18, wherein the LLR computation unit comprises:
a Euclidean distance calculator configured to calculate Euclidean distance values between each of the extended candidate symbol vectors and the reception signal vector; and
an LLR calculator configured to calculate LLR values of bits included in the transmission symbols by using the calculated Euclidean distance values.

20. The MIMO receiver as claimed in claim 19, wherein the LLR values are defined by the Equation, $$LLR(b_i) = \sqrt{\min_{x \in \hat{S}_{i,1}} \|y - Hx\|^2} - \sqrt{\min_{x \in \hat{S}_{i,0}} \|y - Hx\|^2},$$

wherein, $\hat{S}_{i,0}$ and $\hat{S}_{i,1}$ represent candidate symbol vectors sets in which a value of the $i^{th}$ bit is 0 or 1 among extended candidate symbol vector sets, y represents the reception signal vector, H represents a channel matrix, and x represents the transmission symbol vector.

* * * * *